United States Patent [19]

Bradfield et al.

[11] Patent Number: 5,315,195
[45] Date of Patent: May 24, 1994

[54] SELF-ATTACHING COVER FOR A DYNAMOELECTRIC MACHINE

[75] Inventors: Michael D. Bradfield; Thomas R. Sowash, both of Anderson, Ind.

[73] Assignee: General Motors Corporation, Detroit, Mich.

[21] Appl. No.: 51,744

[22] Filed: Apr. 22, 1993

[51] Int. Cl.⁵ .............................................. H02K 5/00
[52] U.S. Cl. ...................................................... 310/89
[58] Field of Search ..................... 220/307; 310/89, 51, 310/52, 64, 58

[56] References Cited

U.S. PATENT DOCUMENTS

| | | | |
|---|---|---|---|
| 1,956,373 | 4/1934 | Critchfield . | |
| 4,356,930 | 11/1982 | Roper | 220/307 X |
| 4,534,088 | 8/1985 | Ricke | 220/307 X |
| 4,706,829 | 11/1987 | Li | 220/306 |

FOREIGN PATENT DOCUMENTS

| | | | |
|---|---|---|---|
| 3532713 | 3/1987 | Fed. Rep. of Germany | 310/89 |
| 1475024 | 3/1967 | France . | |
| 2539930 | 7/1984 | France . | |

*Primary Examiner*—R. Skudy
*Assistant Examiner*—E. To
*Attorney, Agent, or Firm*—Creighton R. Meland

[57] ABSTRACT

A self-attaching protective cover that is attached to the end frame of an alternating current generator. The end frame of the generator has a plurality of circumferentially spaced openings. Each opening has an edge that is comprised of first and second frame surfaces that intersect. The first frame surface is parallel to the longitudinal axis of the end frame and the second frame surface is inclined or slanted so as to be located at an angle to the first frame surface. The cover is a one-piece part formed of plastic material and has a plurality of circumferentially spaced and axially extending latch arms. The cover is attached to the end frame by pushing the latch arms into the openings in the end frame. As this occurs, the latch arms are sprung or forced radially outwardly and they subsequently spring back to cause slanted surfaces on the latch arms to tightly engage the slanted surfaces on the end frame and to cause other surfaces on the latch arms to tightly engage the first frame surfaces.

6 Claims, 3 Drawing Sheets

SELF-ATTACHING COVER FOR A DYNAMOELECTRIC MACHINE

SELF-ATTACHING COVER FOR A DYNAMOELECTRIC MACHINE

This invention relates to a self-attaching cover for dynamoelectric machines such as alternating current generators and, more particularly, to a cover that is self-attached to an end frame of a dynamoelectric machine to provide protection from external damage for electrical components mounted on the end frame.

Alternating current generators for automotive use that mount electrical components such as brush holders, bridge rectifiers and voltage regulators on an outer wall of a slip ring end frame are known. To protect these electrical components from external damage, a cover is provided that can be attached to the slip ring end frame by threaded fasteners that are threaded into the end frame or by threaded fasteners that are threaded into nuts.

It is an object of this invention to provide a cover for a dynamoelectric machine, such as an alternating current generator, that does not use or require threaded fasteners for attaching the cover to the end frame of the machine.

The cover of this invention is formed of plastic material such as a glass filled nylon and is a one-piece molded part. The cover has a plurality of circumferentially spaced and axially extending latch arms. The end portion of each latch arm has two intersecting surfaces. One of these surfaces is generally parallel to the longitudinal axis of the cover and the other surface is inclined or slanted so that it is at an angle to the surface that is parallel to the longitudinal axis of the cover.

The cover is self-attached to the slip ring end frame of an alternating current generator by means of the latch arms. The end frame has a plurality of circumferentially spaced openings that are spaced so as to receive the latch arms of the cover when the cover is attached to the end frame. Each of these openings has an edge that is defined by two intersecting surfaces. One of these surfaces is parallel to the longitudinal axis of the end frame and the other surface is inclined or slanted so that it is at an angle to the longitudinal axis of the end frame.

To assemble the cover to the end frame, the latch arms are pushed into the openings in the end frame and as this occurs the latch arms are forced or sprung radially outwardly. When the latch arms have been fully pushed into the openings, they spring back radially inwardly due to their resilient characteristic. When the latch arms spring back radially inwardly, the slanted surfaces on the latch arms are forced into tight engagement with the slanted surfaces on the end frame. Because of this, an axial force is developed that tends to force end surfaces of the cover into tight engagement with surfaces on the end frame. Further, when the latch arms spring back radially inwardly, the surfaces on the latch arms that are parallel to the longitudinal axis of the cover are forced into tight engagement with the surfaces on the end frame that are parallel to the longitudinal axis of the end frame. Because of this, the cover is radially clamped to the end frame and is prevented from moving radially with respect to the end frame. The net result of what has been described is that during use, the cover remains tightly secured to the end frame and cover rattling does not occur.

DETAILED DESCRIPTION OF THE INVENTION

Figure 1:
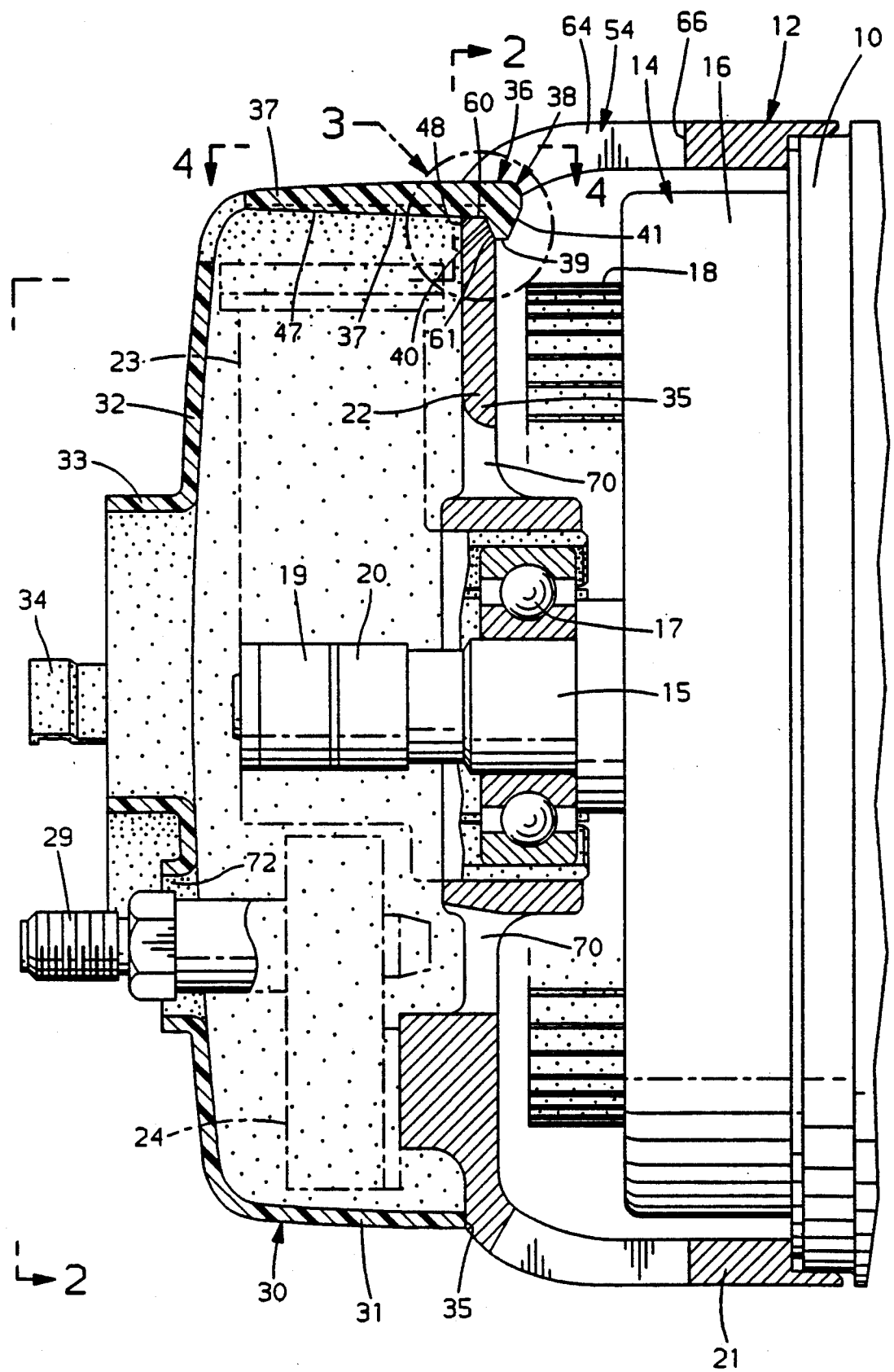
FIG. 1 is a sectional view of one end of an alternating current generator illustrating a cover made in accordance with this invention attached to a slip ring end frame of the generator.

Referring now to the drawings, and more particularly to FIG. 1, a cover is shown attached to one end of a dynamoelectric machine. The dynamoelectric machine is an alternating current generator for automotive use.

The alternating current generator has a stator assembly that is shown diagrammatically in FIG. 1 and designated as 10. This stator assembly, as is well known to those skilled in the art, comprises a slotted stator core. This core supports a three-phase stator winding. The stator assembly is supported by a slip ring end frame 12 and a drive end frame which is not illustrated. The end frame 12 is formed of a metallic material such as die cast aluminum.

The generator has a rotor that is shown partly diagrammatically in FIG. 1 and designated as 14. The rotor 14 has a rotor shaft 15 that carries pole members having interleaved pole teeth, a rotor core and a field coil disposed about the rotor core. The just described parts are not shown in detail but are shown diagrammatically and designated as 16.

One end of rotor shaft 15 is supported for rotation by ball bearing 17 that is supported by end frame 12. The other end of rotor shaft 15 is rotatably supported by a bearing that is supported by the drive end frame of the generator which has not been illustrated. The rotor has a fan 18.

Rotor shaft 15 supports metallic slip rings 19 and 20 that are electrically connected to opposite ends of the rotor field coil by conductors which are not illustrated.

The end frame 12 has an axially extending portion 21 and a radially extending end wall 22.

A brush holder 23 is supported by end wall 22 and slidably supports brushes (not illustrated) that respectively engage slip rings 19 and 20. A bridge rectifier 24 that is comprised of two heat sinks, each of which supports three diodes, is supported by end wall 22. The diodes are connected to form a three-phase full wave bridge rectifier. The AC input terminals of the bridge rectifier are connected to the three-phase stator winding. The end wall 22 further supports a voltage regulator 25 which is shown diagrammatically in FIG. 2. A direct voltage output terminal or stud 29 has a threaded portion that is threaded into one of the heat sinks of the bridge rectifier. The stud 29 is the positive direct voltage output terminal of the bridge rectifier.

A cover generally designated as 30 is attached to end frame 12 and serves to protect the electrical components such as the brush holder 23, the bridge rectifier 24 and the voltage regulator 25 from external damage. The cover 30 is formed of plastic material such as a 33% glass filled nylon. The cover 30 is a one-piece molded part.

The cover 30 has an axially extending wall 31 and a radially extending end wall 32. Extending axially from end wall 32 is a wall 33 that forms an air inlet duct for cover 30. The wall 33 is joined to a side catch 34 that can be used to secure a plastic air duct on a motor vehicle to the duct defined by wall 33. The wall 31 has an end surface 35 that directly tightly engages outer surface portions of end frame 12 when the cover 30 is attached to the end frame.

Figure 4:
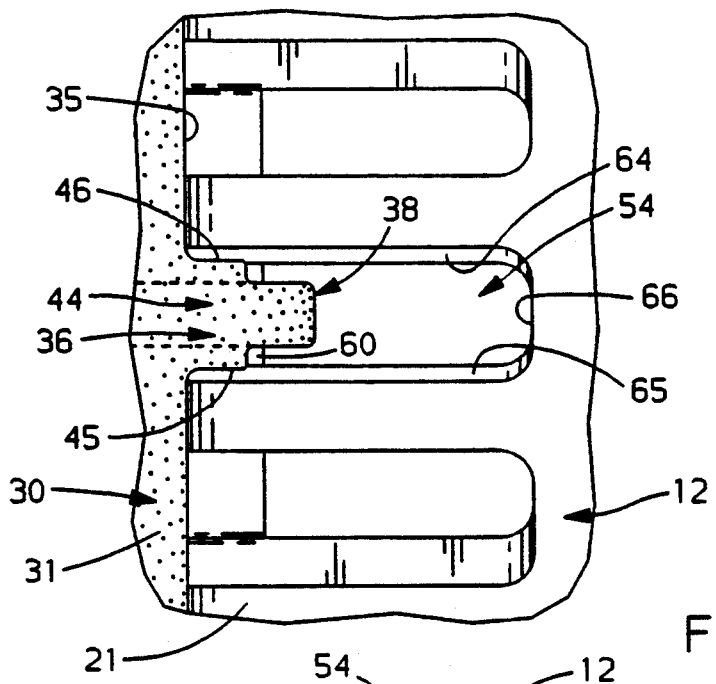
FIG. 4 is a view of a portion of the cover and end frame looking in the direction of arrows 4—4 shown in FIG. 1.

The cover 30 has four circumferentially spaced integral latches that are formed when the cover is molded. Since these latches are identical, only one of the latches, namely latch 36, will be described in detail. The latch 36 has an axially extending rib portion 37 that is joined to a latch arm 38. The latch arm 38, as shown in FIG. 4, extends axially from end surface 35 of cover wall 31.

The latch arm 38 has a surface 39 that is intersected by inclined or slanted surfaces 40 and 41. The surface 40 is located at an angle of thirty degrees from dotted line 42. Dotted line 42 is perpendicular to the center line or longitudinal axis of cover 30. The surface 41 is located at an angle of thirty-five degrees from dotted line 43. Dotted line 43 is perpendicular to the center line or longitudinal axis of cover 30. The latch arm 38 has a laterally extending portion 44 that has opposed side surfaces 45 and 46. The purpose of portion 44, as will be more fully described, is to provide proper angular positioning of cover 30 when it is assembled to end frame 12.

The inside surface 47 of rib 37 is slanted or inclined. Prior to assembly of the cover 30 to end frame 12, the surface 47 is located at an angle of about five or six degrees to a line (not illustrated) that is parallel to the center line or longitudinal axis of cover 30. The surface 47 has a surface portion 48 that intersects surface 40.

Figure 2:
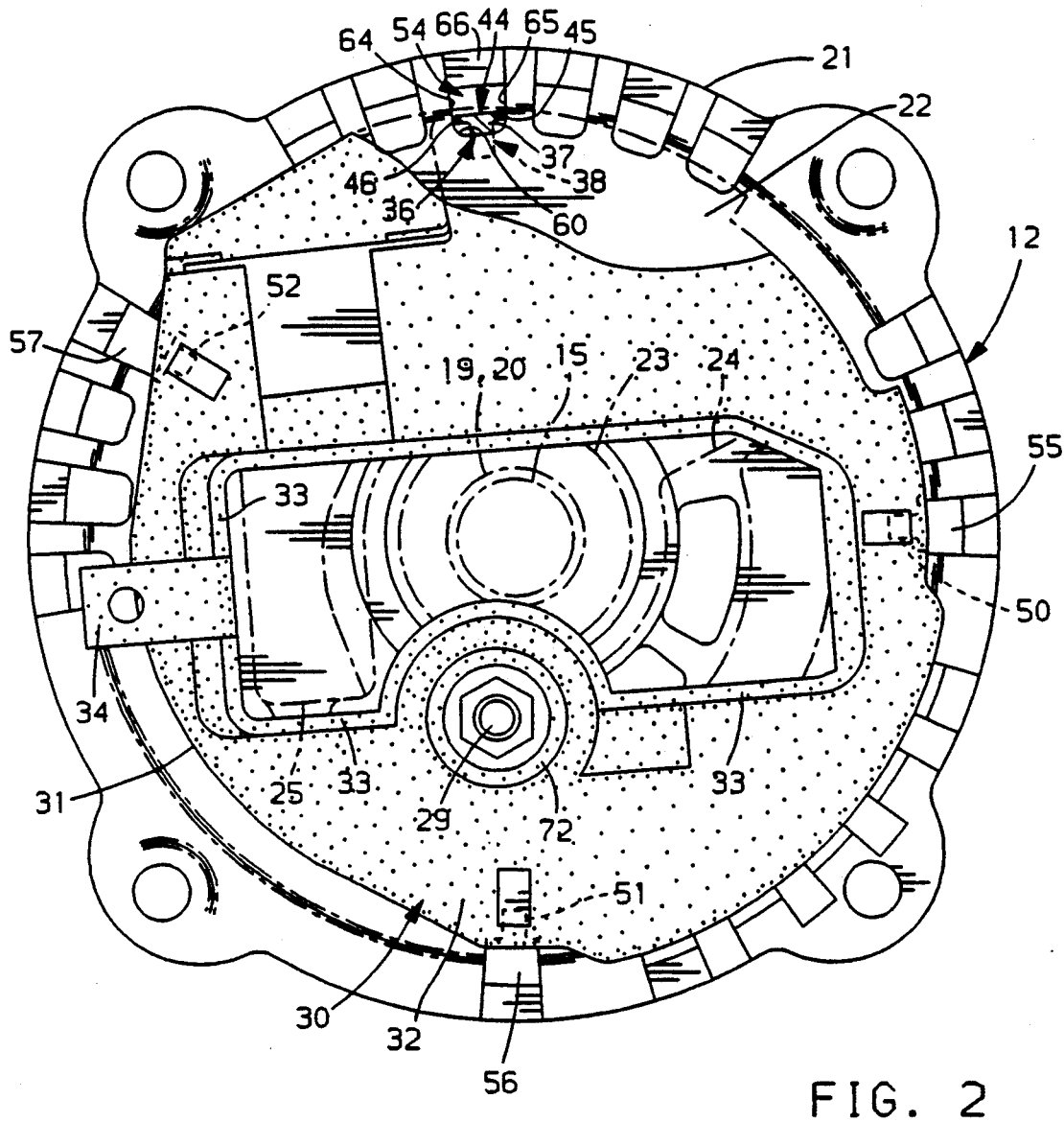
FIG. 2 is a view looking in the direction of arrows 2—2 shown in FIG. 1.

As previously mentioned, the cover 30 has four latches and one of them, namely latch 36, has been described in detail. Only the latch arm part of the other three latches are illustrated in the drawings. The other latch arms are identical to latch arm 38 and are shown in FIGS. 2 where they are designated respectively as 50, 51 and 52.

The end frame 12 has a plurality of circumferentially spaced openings. Four of these openings have been designated respectively as 54, 55, 56 and 57. As will be described in more detail hereinafter, the latch arms 38, 50, 51 and 52 are respectively inserted into openings 54, 55, 56 and 57 when the cover 30 is assembled to frame 12.

The openings 54-57 have the same general shape so that only one of the openings, namely opening 54, will be described in detail. The inner edge of opening 54 is defined by a surface 60 that intersects an inclined or slanted surface 61. The surface 61 is located at an angle of thirty degrees to a dotted line 63. Line 63 is perpendicular to the center line or longitudinal axis of frame 12. The opening 54 is further defined by opposed side surfaces 64 and 65 and another outer surface 66. The openings 55, 56, and 57 all have the same general shape as opening 54 and they all have surfaces that are identical to surfaces 60 and 61 that defines the inner edge of opening 54.

Figure 3:
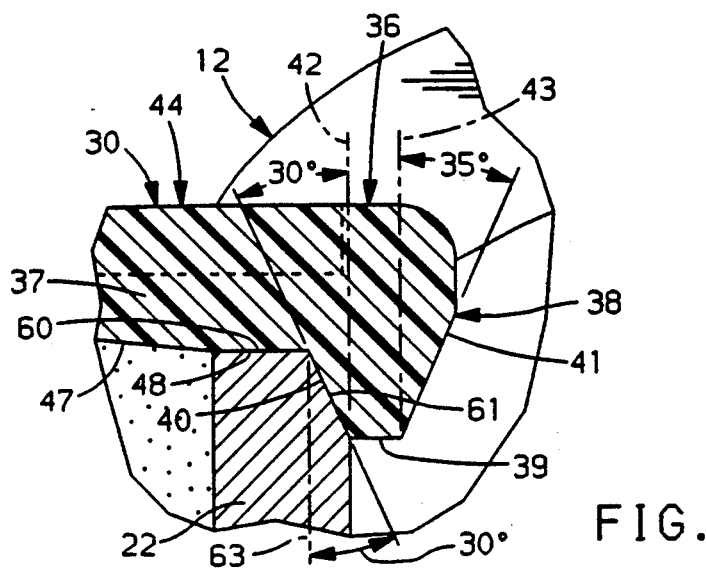
FIG. 3 is an enlarged view of the circled portion of FIG. 1 identified as 3.

The manner in which the cover 30 is assembled to end frame 12 will now be described. In this description, the manner in which latch arm 38 is inserted into opening 54 will be described in detail, it being understood that latch arms 50, 51 and 52 are inserted into respective openings 55, 56 and 57 in the same manner. To assemble cover 30 to frame 12, the latch arms are aligned with respective openings in the frame. In this regard, side surfaces 45 and 46 of portion 44 are angularly positioned such that they can slide into and between frame surfaces 65 and 64. As the cover 30 is pushed or forced toward the end frame, the slanted surface 41 engages the end frame and causes the latch arm 38 to be cammed or forced radially outwardly to a point where eventually the surface 39 of latch arm 38 will engage frame surface 60. As the latch arm 38 continues to be pushed into opening 54, surface 39 will slide along surface 60. As surface 39 leaves surface 60, the latch arm 38 will spring back radially inwardly and the slanted latch arm surface 40 will tightly engage the slanted frame surface 61 as shown in FIGS. 1 and 3. Further, in the final assembled position of cover 30, the surface portion 48 of latch arm 38 tightly engages frame surface 60 throughout the entire length of frame surface 60.

It will be appreciated that with the cover 30 assembled to end frame 12 in a manner that has been described, the engagement of surfaces 40 and 61 will cause the cover surface 35 to be tightly clamped or forced against surfaces of the end frame 12. The cover is therefore fixed from axial movement relative to the end frame.

The engagement of surface 48 of latch arm 38 with frame surface 60 together with engagement of like frame surfaces with like surfaces on latch arms 50, 51 and 52 causes the cover 30 to be radially clamped to end frame 12. In this regard, it can been seen from FIG. 2 that latch arms 38 and 51 will spring back toward each other when the cover 30 is assembled to frame 12. The same is true of latch arms 50 and 52. The distance between the center line of frame 12 and a given frame surface, like surface 60, is so related to the distance between the center line of cover 30 and a given latch arm surface like surface 48, that the latch arms in the final assembled position are in a position that is radially outward from the position the latch arms are in prior to assembly of the cover to the frame. Thus, the latch arms have been stressed radially outwardly and they provide a spring-back force due to their resilience to tightly clamp the cover to the frame both axially and radially.

When the rotor of the alternating current generator is being driven, the fan 18 causes air to be exhausted through openings 54-57 and other air outlet openings that have not been identified by reference numeral. Air enters the alternating current generator through a plastic duct in the engine compartment (not illustrated) that is attached to the duct provided by cover wall 33. Air passes through the interior of cover 30 and through openings 70 formed in end wall 22 of frame 12. The fan 18 causes the air to flow from openings 70 toward and out of openings like opening 54. The flow of air through cover 30 cools the brush holder, the bridge rectifier and the voltage regulator. One end of the stator winding of the stator assembly is cooled by air flowing toward air outlet openings like opening 54.

It has been pointed out that portions like portion 44 of latch arm 38 provide for proper angular positioning of cover 30 relative to frame 12 when cover 30 is assembled to frame 12. These portions, like portion 44, also prevent the cover 30 from rotating relative to frame 12 once the cover is assembled to the frame.

The cover 30 has an opening 72 and stud 29 projects through this opening.

Figure 5:
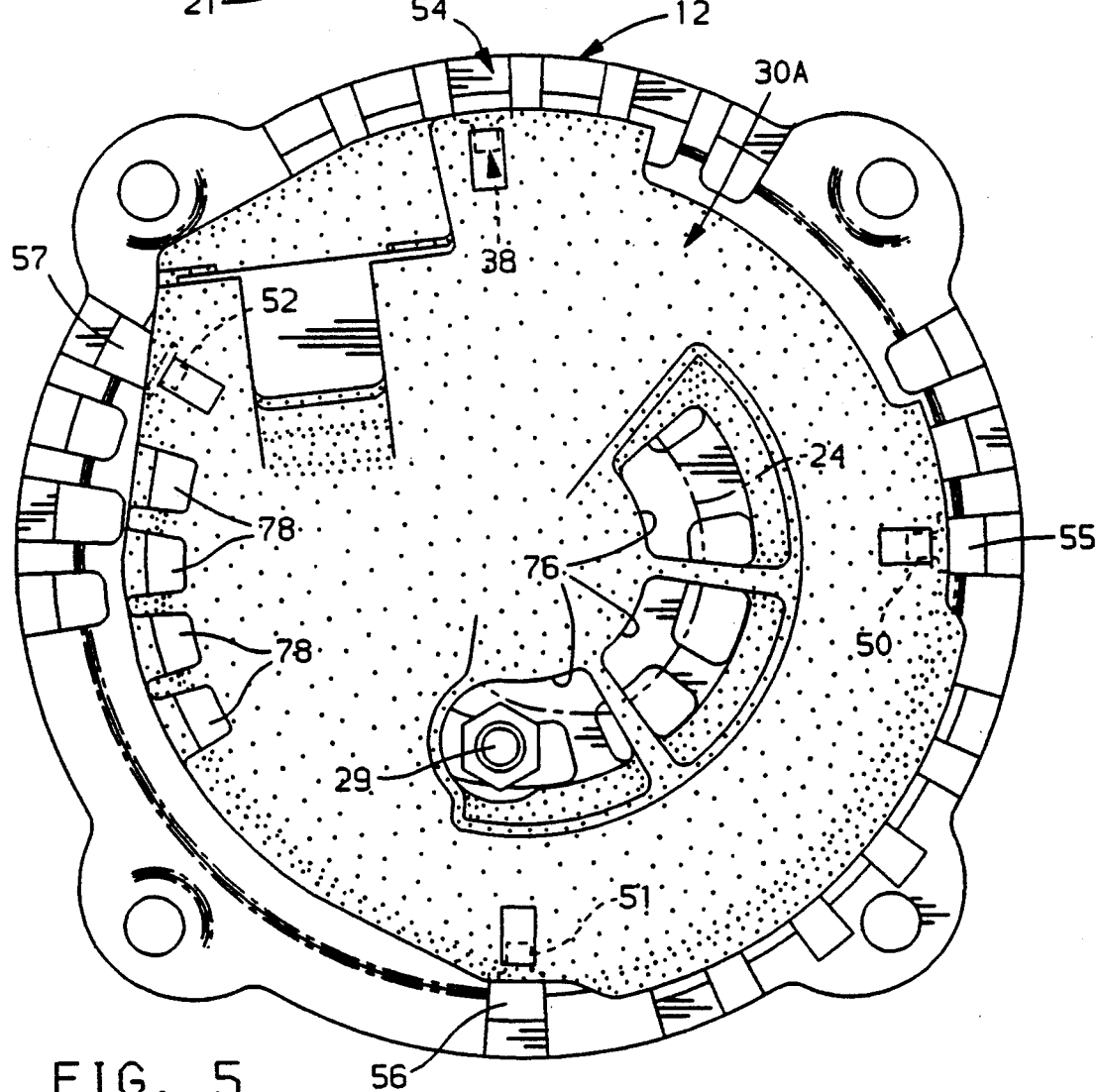
FIG. 5 is an end view of a modified cover made in accordance with this invention.

Referring now to FIG. 5, a modified cover is illustrated that is not of the ducted type or, in other words, does not have a duct like the duct provided by wall 33 shown in FIGS. 1 and 2. In FIG. 5, the same reference numerals have been used as were used in FIGS. 1 and 2 to identify corresponding elements in all the figures. The cover 30A shown in FIG. 5, instead of having a duct, has three air inlet passages each designated as 76 and four additional smaller air inlet passages each designated as 78. These air inlet passages are not associated with any sort of plastic duct on the motor vehicle.

The cover 30A is attached to the end frame 12 in the same manner that the cover 30 is attached to the end frame in FIGS. 1 and 2. Thus, the cover 30A shown in FIG. 5 has latch arms 38, 50, 51 and 52 that respectively project into openings 54, 55, 56 and 57 formed in end frame 12.

The direct voltage output stud terminal 29 in FIG. 5 projects through one of the air inlet openings 76.

The embodiments of the invention in which an exclusive property or privilege is claimed are defined as follows:

1. In combination, a dynamoelectric machine having an end frame, at least one electrical component supported by said end frame, a plurality of circumferentially spaced openings in said end frame, each of said openings having an edge that is comprised of a first frame surface that is located substantially parallel to a longitudinal axis of said end frame and a second slanted frame surface that is located at an angle to said first frame surface, and a onepiece cover formed of plastic material attached to said end frame to protect said electrical component from external damage, said cover having an end wall and an axially extending side wall, said side wall having an end surface that engages said end frame, said cover having a plurality of circumferentially spaced and axially extending latch arms that respectively project into said openings in said end frame, each said latch arm having a first latch arm surface and a second slanted latch arm surface that intersects said first latch arm surface, said second slanted latch arm surface located at an angle to said first latch arm surface, said second slanted latch arm surfaces respectively directly engaging said second slanted frame surfaces to cause said end surface of said side wall to tightly engage said end frame and to prevent said cover from moving axially with respect to said end frame, said first latch arm surfaces respectively directly engaging said first frame surfaces to radially clamp said cover to said end frame to thereby prevent said cover from moving radially with respect to said end frame.

2. The combination according to claim 1 where said dynamoelectric machine is an alternating current generator for automotive use.

3. The combination according to claim 1 where said openings in said end frame provide air passages for cooling air.

4. The combination according to claim 1 where said openings in said end frame provide air passages for permitting a flow of cooling air from the interior to the exterior of said end frame.

5. The combination according to claim 1 where said edge of a said opening is an inner edge.

6. The combination according to claim 1 where said end wall of said cover has an axially extending wall that forms an air inlet duct.

* * * * *